Dec. 16, 1952 J. J. Z. VAN ZELST ET AL 2,622,191

RECEIVER CIRCUIT ARRANGEMENT

Filed Aug. 22, 1950 2 SHEETS—SHEET 1

INVENTORS
JOHANNES JACOBUS ZAALBERG VAN ZELST
JOHANNES MEYER CLUWEN
BY Fred M. Vogel
AGENT

INVENTORS
JOHANNES JACOBUS ZAALBERG VAN ZELST
JOHANNES MEYER CLUWEN

BY

Fred M. Vogel
AGENT

Patented Dec. 16, 1952 2,622,191

UNITED STATES PATENT OFFICE 2,622,191

RECEIVER CIRCUIT ARRANGEMENT

Johannes Jacobus Zaalberg van Zelst and Johannes Meyer Cluwen, Eindhoven, Netherlands, assignors to Hartford National Bank and Trust Company, as trustee Application August 22, 1950, Serial No. 180,762
In the Netherlands September 24, 1949

5 Claims. (Cl. 250—20)

Figure 1:
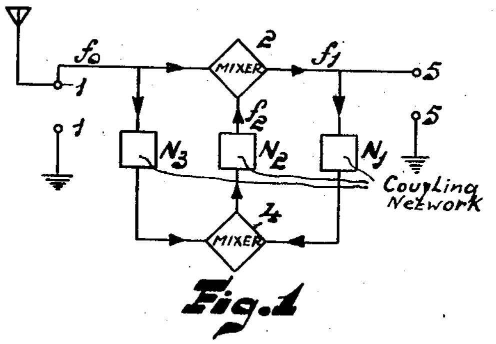

The present invention relates to a receiver circuit arrangement and more particularly to a receiver circuit arrangement comprising at least two mixing stages, to both of which the input signal is supplied. Local oscillations, controlled by the input signal, are produced in the circuit by connecting the output of the first mixer through a first coupling element to the input of the second mixer and connecting the output of the second mixer through a second coupling element to the input of the first.

The principal object of the present invention is to provide an improved receiver circuit arrangement of the above type wherein the frequency of the intermediate frequency signal is substantially independent of minor mistuning of the tuned circuits.

It is another object of the invention to provide a receiver circuit arrangement of the above type wherein automatic frequency control is provided.

Further objects of the invention will appear from the following description.

According to the invention, these objects are achieved by giving the first coupling element a frequency-phase characteristic curve a flank, having a steeper slope than the frequency-phase characteristic curve of the second coupling element. The flank of the frequency-phase characteristic curve of the first coupling element provides maximum and minimum phase values which, when divided by the slope of the frequency-phase characteristic of the second coupling element, is less than the predetermined amount which may be, for example, the usual frequency difference between two transmitters having adjacent frequency spectrum allocations.

Figure 2:
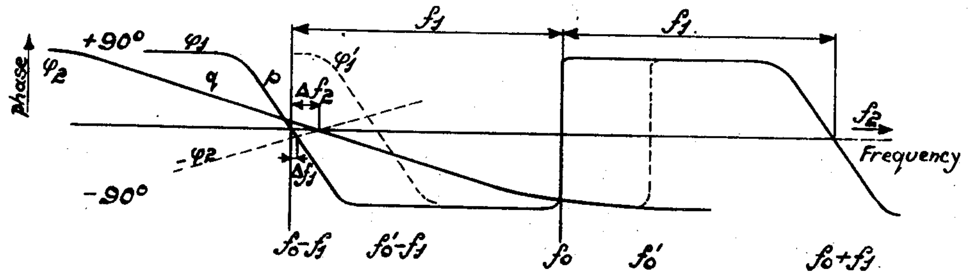
Figure 3:
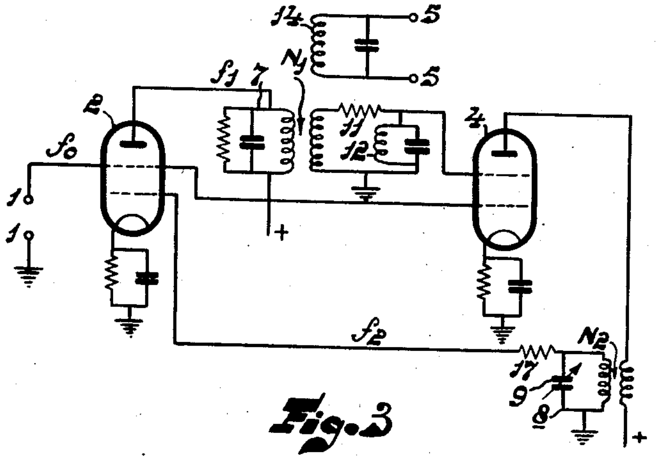
Figure 4:
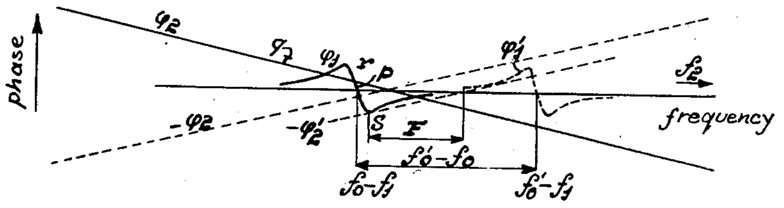
Figure 5:
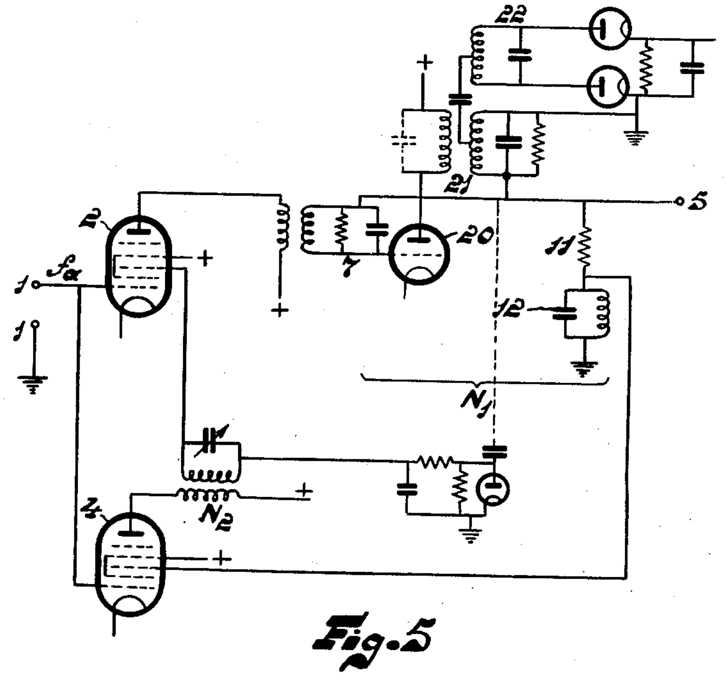

In order that the invention may be more clearly understood and readily carried into effect, it will now be described in detail with reference to the accompanying drawing, in which like circuit elements are designated by the same reference numerals and in which:

Fig. 1 shows, in block form, a circuit-arrangement according to the invention,

Figs. 2 and 4 show the frequency-phase characteristic curves, as a function of the frequency, of the various coupling elements used in the circuit-arrangement shown in Fig. 1, Fig. 3 shows a receiving circuit-arrangement, according to the invention, for the reception of amplitude-modulated oscillations, and Fig. 5 shows a receiving circuit-arrangement for the reception of frequency-modulated oscillations.

Referring now to the drawing and more particularly to Fig. 1, the signal oscillations $f_0$ are supplied across input terminals 1—1 to two mixing stages 2 and 4. The output of the first mixer 2 is connected through first coupling element, for example a network $N_1$, to the input of the second mixer 4. The output of mixer 4 is connected through a second coupling element, for example a network $N_2$, to the input of the first mixer 2. A further coupling element $N_3$ intercouples input terminals 1—1 and the second mixer stage 4. The circuit-arrangement itself is thus adapted to produce an oscillation which can be derived from the output of the first mixer through output terminals 5—5.

The frequency value of this oscillation may be determined with the use of Fig. 2. Assuming the frequency of the oscillation across the first coupling element $N_1$ to be equal to $f_1$ and that across the second coupling element $N_2$ to be equal to $f_2$, the mixed oscillation $f_1=f_0-f_2$ or $f_1=f_2-f_0$, will, as a function of the frequency $f_2$, be subjected to a phase shift in the coupling element $N_1$, as indicated by curve $\varphi_1$. Assuming that the first coupling element $N_1$ blocks passage of the oscillation $f_0+f_2$, this oscillation can be neglected. The oscillation $f_2$ which is again separated in the mixer stage 4 from the input oscillation $f_0$, will be subjected to a phase shift in the coupling element $N_2$, as indicated by curve $\varphi_2$. The frequency $f_2$ is now near that value at which the sum of the phase shifts $\varphi_1$ and $\varphi_2$ of the coupling elements $N_1$ and $N_2$ and of that of the third coupling element $N_3$, if any, is equal to zero, i. e., if the coupling element $N_3$ is neglected, at the point of intersection of the characteristic curves $\varphi_1$ and $-\varphi_2$, the latter being the mirror of the characteristic curve $\varphi_2$.

In the circuit arrangement shown in Fig. 3, the coupling element $N_1$ comprises a fixed tuned circuit 7 and the coupling element $N_2$ comprises a circuit 8, the tuning of which may be varied, for example with the use of a tuning capacitor 9. The mixing stages 2 and 4 may be constituted by heptodes or hexodes, of which only the two control-grids are shown for the sake of simplicity.

If impedances 11 and 12 are neglected, for the time being, the phase characteristic curves $\varphi_1$ and $-\varphi_2$ would, if the circuit 8 were tuned exactly to the sum or the difference of frequency $f_0$ and the tuning frequency of circuit 7, intersect each other at a phase equal to zero so that the frequency $f_1$ of the oscillation across circuit 7 would be exactly equal to the resonant frequency of this circuit. If, as shown in Fig. 2, owing to detuning of the capacitor 9, the tuning of circuit 8 shifts by a value $\Delta f_2$, the oscillation across circuit 7 will shift by such a value $\Delta f_1$ that the total phase shift is again equal to zero. As the flank $p$ of the phase characteristic curve $\varphi_1$ of the network $N_1$ is made steeper than the flank $q$ of the phase characteristic curve $\varphi_2$ of the network $N_2$, the frequency shift $\Delta f_1$ of the oscillation $f_1$ at a definite wrong tuning $\Delta f_2$ of the network $N_2$ will be smaller. In other words, the frequency of the oscillation $f_1$, which is supplied from circuit 7 through circuit 14 to the output terminals 5—5, is automatically controlled.

However, the circuit-arrangement hitherto described is not suitable for automatic frequency control, since the frequency shift $\Delta f_2$, which must be given to the circuit 8 in order to tune to a different frequency $f'_0$, greatly exceeds the normal frequency difference between two transmitters having adjacent frequency allocations.

This may be explained by considering the fact that, for a slightly stronger transmitter with a frequency $f'_0$, for which the phase characteristic curve $\varphi'_1$ applies, the self-oscillation condition is fulfilled. This is true because the characteristic curve $-\varphi_2$ also intersects the characteristic curve $\varphi'_1$ and the amplitude of the oscillation produced is only slightly attenuated in the circuits 7 and 8. Thus, if a signal from a stronger transmitter $f'_0$ is received by means of the circuit-arrangement hitherto described, the receiver will remain tuned, even if the circuit 9 is detuned, to this transmitter $f'_0$, as long as the self-oscillation condition is more favorable for this stronger transmitter. Tuning to a desired weaker signal would thus be impossible.

According to the invention, in order to enable reception of weaker signals, the phase relation of coupling elements $N_1$ and $N_2$ must be such that, even with a detuning of circuit 8 corresponding to a usual frequency difference $f_0-f'_0$ between two adjacent transmitters, the self-oscillation condition for one of these transmitters can no longer be fulfilled. For this purpose the phase characteristic curve $\varphi_1$ of the coupling element $N_1$ is given the shape shown in Fig. 4. In Fig. 4 the steep flank $p$ of curve $\varphi_1$ is bounded by optimum phase values $r$ and $s$. The quotient of these optimum phase values divided by the slope of the flank $q$ of the characteristic curve $\varphi_2$ yields a frequency value F which is lower than the usual frequency difference $f'_0-f_0$ between two adjacent transmitters. A tuning of circuit 8, corresponding to the phase characteristic curve $\varphi_2$ of $-\varphi_2$ will thus provide only reception of the frequency $f_0$. A tuning of this circuit 8 corresponding with the curve $-\varphi'_2$ renders the self-oscillation condition for the frequency $f_0$ impossible and that of the transmitter with frequency $f'_0$ possible. In general the frequency difference $f'_0-f_0$ will be substantially equal to the pass band width of the receiver.

A network $N_1$, with the use of which such a phase characteristic curve $\varphi_1$ can be realized in practice, is shown in Fig. 3. Network $N_1$ further comprises a resistance 11 and a resonant circuit 12 tuned to the same frequency as the circuit 7, the resistance 11 having a resistance value of the same order of magnitude as the resonance impedance of the circuit 12.

As a matter of fact, a tuned circuit having a quality Q, a resonance frequency $\omega_0$ and a resonance impedance $R_0$ exhibits a phase characteristic curve, the slope of which in the neighborhood of resonance, is equal to $-2Q/\omega_0$. If a resistance R is connected in series with such a circuit the slope becomes $R_0/R+R_0$ times smaller. Since, however, the circuit 8 is generally tuned to a higher frequency than the circuit 12, the condition that the phase characteristic curve of the coupling element $N_1$ should be much steeper than that of the coupling element $N_2$ can still be readily fulfilled. In contradistinction thereto, it is found that, due to the presence of the resistance 11, the phase characteristic curve of the coupling element $N_1$ exhibits optimum values $r$ and $s$ equal to $R_0/\sqrt{R(R+R_0)}$. The required phase characteristic curve $\varphi_1$ can thus be realized in practice with the use of an adequately selective circuit 12, which may be a crystal, and a resistance 11 which has a resistance value of the same order of magnitude as the impedance of the circuit 12 at resonance.

If required, several coupling elements 7, 11, 12 may be connected in series so as to enable tuning to various frequency bands, for example, to the band for frequency-modulation and to that for amplitude-modulation broadcast transmitters.

In order to secure undistorted reception of amplitude-modulated oscillations with the use of the circuit-arrangement shown in Fig. 3, means are provided to maintain constant the amplitude of the oscillation $f_2$, which oscillation is supplied through coupling element $N_2$ to the mixer stage 2. This may be achieved, for example, in a simple manner by so adjusting the mixer stage 2 that the amplitude of the self-oscillation is determined by the grid-cathode space of the tube 2. In this case a resistance 17 may be included in the network $N_2$ and, due to voltage drop across this resistance 17 and damping of the circuit $N_2$, the amplitude of the oscillation produced will be substantially constant. As an alternative, a synchronized oscillator may be included between the output of the second mixer 4 and the input of the first mixer 2. The self-oscillation condition will thus also be fulfilled even at a smaller amplitude of the input oscillation.

Fig. 5 shows a receiving circuit-arrangement for frequency-modulated oscillations in which such an amplitude-limiter or synchronized oscillator must be included in the circuit of the first coupling element $N_1$. In this circuit-arrangement, a tube 20 is used as the oscillator. The output oscillation of the mixer stage 2 is applied through a tuned circuit 7 to oscillator 20. The anode circuit of tube 20 is coupled back to the grid circuit through strongly damped circuits 21. The feedback provided by this coupling is substantially free of phase shift. The output oscillation of the tube 20, which is thus amplified to a marked extent, is fed to a network 11, 12, which has a phase characteristic curve $\phi_1$ as shown in Fig. 4. If necessary, unwanted amplitude modulation of the signal oscillations may be suppressed by detecting the output oscillation of the oscillator 20 and using the detected voltage to control the mutual conductance of one of the preceding tubes in the receiving channel, particularly that of the mixer 2.

The circuit-arrangement shown in Fig. 5 also produced negative frequency feedback of the signal oscillations. If the coupling element $N_1$, as shown in Fig. 5, is provided with the series combination of the resistance 11 and the tuned circuit 12, the negative frequency feedback will not be completely linear but, in accordance with the phase characteristic curve $\phi_1$, will produce a small third harmonic across the output circuit 2. However, this third harmonic is capable of compensating the third harmonic distortion which is produced by the discriminator filter of a push-pull frequency demodulator 22 following the circuit-arrangement, so that substantially linear detection is ensured.

While the invention has been described in a particular use thereof and in particular embodiments, it is not desired that it be limited thereto for obvious modifications will occur to those skilled in the art without departing from the spirit and scope of the invention.

What we claim is:

1. A receiver circuit arrangement for the selective reception from a plurality of spaced frequencies of an input signal wave having a first given frequency, comprising first and second mixing stages each having an input and an output circuit, means to apply said signal wave to the input circuits of said first and second mixing stages, a first coupling element having a first given phase-frequency characteristic intercoupling the output circuit of said first mixing stage and the input circuit of said second mixing stage to combine the output wave of said first mixing stage with said signal wave to produce a local oscillation having a second given frequency, and a second coupling element having a second given phase-frequency characteristic intercoupling the outpult circuit of said second mixing stage and the input circuit of said first mixing stage to apply said local oscillation to said first mixing stage to combine with said signal wave to produce said output wave, the phase-frequency characteristic of said first coupling element having a local maximum and a minimum phase value and a portion between them with a given first slope, the phase-frequency characteristic of said second coupling element having a given second slope at the operating frequencies, said second slope being smaller than said first slope, the quotient of said maximum of minimum phase value and said second slope being less than the frequency spacing of said plurality of spaced frequencies.

2. A receiver circuit arrangement for the selective reception from a plurality of spaced frequencies of an amplitude modulated input signal wave having a first given frequency, comprising first and second mixing stages each having an input and an output circuit, means to apply said signal wave to the input circuits of said first and second mixing stages, a first coupling element having a first given frequency-phase characteristic intercoupling the output circuit of said first mixing stage and the input circuit of said second mixing stage to combine the output wave of said first mixing stage with said signal wave to produce a local oscillation having a second given frequency, a second coupling element having a second given frequency-phase characteristic intercoupling the output circuit of said second mixing stage and the input circuit of said first mixing stage to apply said local oscillation to said first mixing stage to combine with said signal wave to produce said output wave, and amplitude limiting means coupled to said second mixing stage to maintain the amplitude of said local oscillation substantially constant the phase-frequency characteristic of said first coupling element having a local maximum and a minimum phase value and a portion between them with a given first slope, the phase-frequency characteristic of said coupling element having a given second slope at the operating frequencies, said second slope being smaller than said first slope, the quotient of said maximum of minimum phase value and said second slope being less than the frequency spacing of said plurality of spaced frequencies.

3. A receiver circuit arrangement for the selective reception from a plurality of spaced frequencies of a frequency modulated input signal wave having a first given central frequency, comprising first and second mixing stages each having an input and an output circuit, means to apply said signal wave to the input circuits of said first and second mixing stages, a first coupling element having a first given frequency-phase characteristic intercoupling the output circuit of said first mixing stage and the input circuit of said second mixing stage to combine the output wave of said first mixing stage with the signal wave to produce a local oscillation having a given second frequency, said first coupling element comprising an oscillator synchronized with the output frequency of said first mixing stage, and a second coupling element having a second given frequency-phase characteristic intercoupling the output circuit of said second mixing stage and the input circuit of said first mixing stage to apply said local oscillation to said first mixing stage to combine with said signal wave to produce said output wave, the phase-frequency characteristic of said first coupling element having a local maximum and a minimum phase value and a portion between them with a given first slope, the phase-frequency characteristic of said second coupling element having a given second slope at the operating frequencies, said second slope being smaller than said first slope, the quotient of said maximum of minimum phase value and said second slope being less than the frequency spacing of said plurality of spaced frequencies.

4. A receiver circuit arrangement for the selective reception from a plurality of spaced frequencies of an input signal wave having a first given frequency, comprising first and second mixing stages each having an input and an output circuit, means to apply said signal wave to the input circuits of said first and second mixing stages, a first coupling element having a first given frequency-phase characteristic intercoupling the output circuit of said first mixing stage and the input circuit of said second mixing stage to combine the output wave of said first mixing stage with the signal wave to produce a local oscillation having a given frequency, said first coupling element comprising in series circuit-arrangement a parallel resonant circuit having a given impedance value at the resonant frequency thereof and a resistive element having a resistance value at least of the same order of magnitude as said given impedance value, and a second coupling element having a second given frequency-phase characteristic intercoupling the output circuit of said second mixing stage and the input circuit of said first mixing stage to apply said local oscillation to said first mixing stage to combine with said signal wave to produce said output wave, the phase-frequency characteristic of said first coupling element having a local maximum and a minimum phase value and a portion between them with a given first slope, the phase-frequency characteristic of said second coupling element having a given second slope at the operating frequencies, said second slope being smaller than said first slope, the quotient of said maximum of minimum phase value and said second slope being less than the frequency spacing of said plurality of spaced frequencies.

5. A receiver circuit arrangement for the selective reception from a plurality of spaced frequencies of a frequency modulated input signal wave having a first given central frequency, comprising first and second mixing stages each having an input and an output circuit, means to apply said signal wave to the input circuits of said first and second mixing stages, a first coupling element having a first given frequency-phase characteristic intercoupling the output circuit of said first mixing stage to combine the output wave of said first mixing stage with said signal wave to produce a local oscillation having a second given frequency and the input circuit of said second mixing stage, said first coupling element comprising in series circuit arrangement a parallel resonant circuit having a given impedance value at the resonant frequency thereof and a resistive element having a resistance value at least of the same order of magnitude as said given impedance value, a second coupling element having a second given frequency-phase characteristic intercoupling the output circuit of said second mixing stage and the input circuit of said first mixing stage to apply said local oscillation having a second given frequency to said first mixing stage to combine with said signal wave to produce said output wave, the frequency-phase characteristic of said first coupling element having first and second spaced portions having a first given slope and a first intermediate portion having a second slope different from said first slope, the phase-frequency characteristic of said first coupling element having a local maximum and a minimum phase value and a portion between them wtih a given first slope, the phase-frequency characteristic of said second coupling element having a given second slope at the operating frequencies, said second slope being smaller than said first slope, the quotient of said maximum of minimum phase value and said second slope being less than the frequency spacing of said plurality of spaced frequencies, and a push-pull frequency detector coupled to the output circuit of said first mixing stage and providing a given third harmonic distortion of the frequency modulated oscillation derived from the output circuit of said first mixing stage, the given impedance values of said resonant circuit and the resistance value of said resistive element being chosen to produce a third harmonic distortion in said push-pull detector equal to and opposite to said given third harmonic distortion.

JOHANNES JACOBUS ZAALBERG VAN ZELST.
JOHANNES MEYER CLUWEN.

REFERENCES CITED

The following references are of record in the file of this patent:

UNITED STATES PATENTS

| Number | Name | Date |
|---|---|---|
| 2,206,695 | Guanella | July 2, 1940 |
| 2,530,614 | Hugenholtz | Nov. 21, 1950 |
| 2,540,333 | Hugenholtz | Feb. 6, 1951 |